United States Patent
Chiu et al.

Patent Number: 5,483,590
Date of Patent: Jan. 9, 1996

[54] PROCESSING OF OPERATIONAL DATA IN TELECOMMUNICATION SYSTEM

[75] Inventors: Lin Chiu, Gahanna; Hugh G. Frank, Blacklick, both of Ohio; Peter W. Lozo, Westfield, N.J.; Thomas J. Williams, Pickerington, Ohio

[73] Assignee: AT&T Corp., Murray Hill, N.J.

[21] Appl. No.: 361,916

[22] Filed: Dec. 22, 1994

Related U.S. Application Data

[63] Continuation of Ser. No. 163,319, Dec. 8, 1993, abandoned.

[51] Int. Cl.⁶ ................................................. H04M 3/22
[52] U.S. Cl. ........................ 379/269; 379/265; 379/266; 379/112
[58] Field of Search ................................ 379/10, 11, 12, 379/13, 14, 15, 17, 32, 34, 207, 220, 221, 265, 266, 269, 112, 115

[56] References Cited

U.S. PATENT DOCUMENTS

| | | | |
|---|---|---|---|
| 4,456,788 | 6/1984 | Kline et al. | 379/34 |
| 4,510,351 | 4/1985 | Costello et al. | 379/34 |
| 4,756,019 | 7/1988 | Szybicki | 379/112 |
| 4,864,598 | 9/1989 | Lynch et al. | 379/32 |
| 4,984,264 | 1/1991 | Katsube | 379/220 |
| 5,014,262 | 5/1991 | Harshavardhana | 379/221 |
| 5,065,393 | 11/1991 | Sibbitt et al. | 379/13 |
| 5,068,892 | 11/1991 | Livanos | 379/221 |
| 5,153,909 | 10/1992 | Beckle et al. | 379/266 |
| 5,295,183 | 3/1994 | Langlois et al. | 379/221 |
| 5,335,268 | 8/1994 | Kelly, Jr. et al. | 379/221 |

*Primary Examiner*—Jeffery A. Hofsass
*Assistant Examiner*—Scott Wolinsky
*Attorney, Agent, or Firm*—Charles L. Warren

[57] ABSTRACT

A data analysis processor receives data collected from switch is and applies a plurality of stored rules to yield corresponding test results. If a test result exceeds stored boundary conditions corresponding to the test, an exception condition is determined to exist and the corresponding record associated with the test is transmitted to a table in the database to generate an exception table. Such preprocessing minimizes computational overhead and time required to generate exception reports.

8 Claims, 3 Drawing Sheets

FIG. 2
*(PRIOR ART)*

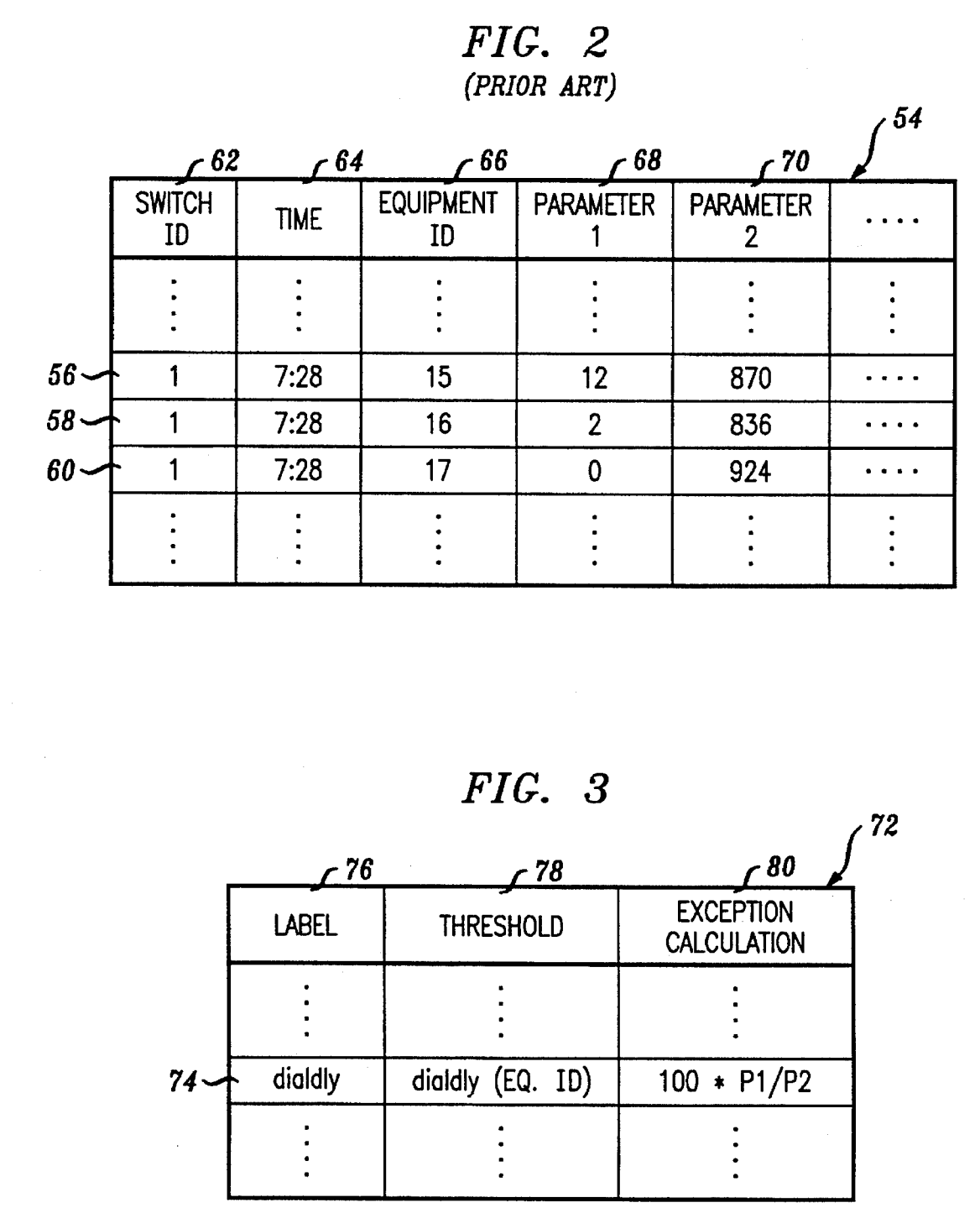

| SWITCH ID | TIME | EQUIPMENT ID | PARAMETER 1 | PARAMETER 2 | .... |
|---|---|---|---|---|---|
| ⋮ | ⋮ | ⋮ | ⋮ | ⋮ | ⋮ |
| 1 | 7:28 | 15 | 12 | 870 | .... |
| 1 | 7:28 | 16 | 2 | 836 | .... |
| 1 | 7:28 | 17 | 0 | 924 | .... |
| ⋮ | ⋮ | ⋮ | ⋮ | ⋮ | ⋮ |

FIG. 3

| LABEL | THRESHOLD | EXCEPTION CALCULATION |
|---|---|---|
| ⋮ | ⋮ | ⋮ |
| dialdly | dialdly (EQ. ID) | 100 * P1/P2 |
| ⋮ | ⋮ | ⋮ |

FIG. 4

| THRESHOLDS | UPPER BOUNDARY | LOWER BOUNDARY |
|---|---|---|
| ⋮ | ⋮ | ⋮ |
| dialdly (15) | 1 | 0 |
| dialdly (16) | 1 | 0 |
| dialdly (17) | 1 | 0 |
| ⋮ | ⋮ | ⋮ |

FIG. 5

| LABEL | SWITCH ID | EQUIPMENT ID | TIME | CALCULATION | UPPER BOUNDARY | LOWER BOUNDARY | .... |
|---|---|---|---|---|---|---|---|
| ⋮ | ⋮ | ⋮ | ⋮ | ⋮ | ⋮ | ⋮ | ⋮ |
| dialdly | 1 | 15 | 7:28 | 1.38 | 1 | 0 | .... |
| ⋮ | ⋮ | ⋮ | ⋮ | ⋮ | ⋮ | ⋮ | ⋮ |

PROCESSING OF OPERATIONAL DATA IN TELECOMMUNICATION SYSTEM

This application is a continuation of application Ser. No. 08/163,319, filed on Dec. 8, 1993, now abandoned.

BACKGROUND OF THE INVENTION

This invention is generally directed to telecommunication systems which periodically generate operational data that is analyzed to evaluate the system or elements in the system. More specifically, this invention is directed to improvements in the processing of such data.

The public switched telephone network (PSTN) provides an illustrative example of a telecommunications system in which a plurality of switches, such as AT&T 5ESS® switches, are distributed throughout the network to service associated subscribers. Each switch monitors its own operational characteristics and periodically generates a block of operational data. This data is collected, such as by an AT&T traffic data management system, and stored in a series of tables in a relational database. This stored data is then analyzed by a traffic engineer utilizing the capabilities of the database to locate anomalies and conditions which indicate current problems or could lead to future problems.

While such a process for analyzing the operational data is effective, substantial computational resources and time are required to process this data in view of its voluminous nature. For example, each switch may generate a block of operational data consisting of 1,000–70,000 bytes of data every 30 minutes. Since the data is typically analyzed over a predetermined time frame, such as 24 hours, a substantial amount of data is accumulated. This results in the allocation of substantial computing resources and relatively long times required to process the data. The time required to process the data is exacerbated due to the substantial overhead processing requirements associated with relational databases. Thus, there exists a need to minimize the computational time associated with processing such operational data.

SUMMARY OF THE INVENTION

It is an object of the invention to minimize the computational time required to process the operational data associated with equipment utilized in a telecommunications system.

In accordance with an exemplary embodiment of the present invention, a telecommunications system includes a plurality of switches which each collect data relating to operational conditions of the respective switch. A data analysis processor receives the collected data. A plurality of rules are stored in the data analysis processor's memory wherein each rule defines a test for an associated operational condition. These rules are applied to the operational data as stored in data records to produce a test result. A determination is made if an exception condition exists based on a comparison of the test result to predetermined boundary limits associated with the rule which generated the test result. If an exception condition is determined, at least a portion of the corresponding data record is transmitted to a database which stores the transmitted portions in a table, thereby creating an exception condition table in the database. Thus, the original operational data from the switches is initially processed by the data analysis processor to minimize the computational time required by the database to generate exception reports.

BRIEF DESCRIPTION OF THE DRAWING'S

FIG. 2 illustrates a table showing representative prior art operational data generated by a switch.

FIG. 3 illustrates a table showing a set of rules to be applied to the operational data.

FIG. 4 illustrates a table in which upper and lower boundary limits are stored for corresponding tests of FIG. 3.

FIG. 5 illustrates an exception data table which is utilized to store exception records generated in accordance with the present invention.

DETAILED DESCRIPTION

Figure 1:
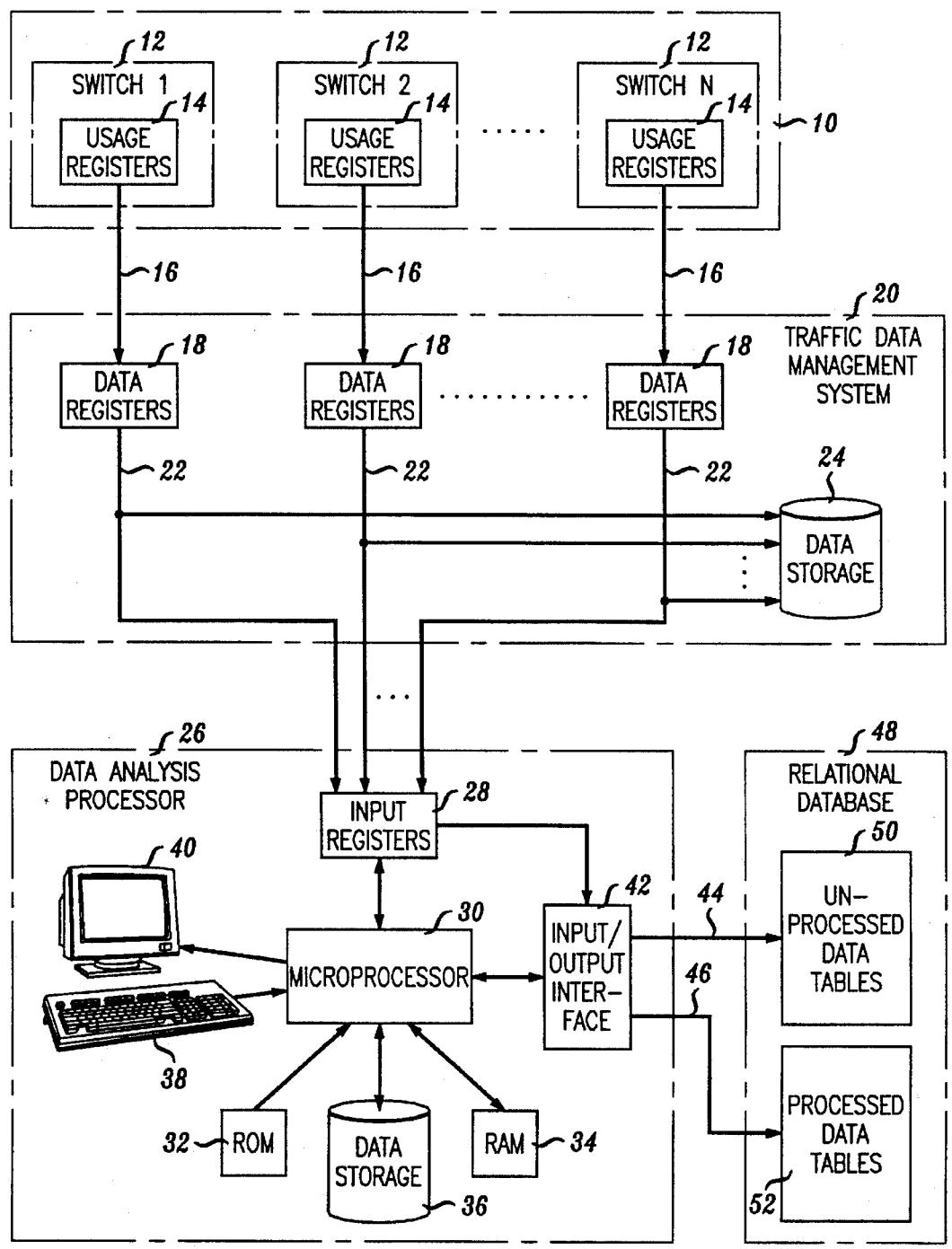
FIG. 1 illustrates a block diagram of a telecommunications system which incorporates an embodiment of the present invention.

FIG. 1 illustrates a telecommunication system which includes a network 10 of telecommunication switches 12 such as AT&T 5ESS switches. Each of the switches includes usage registers 14 or other data storage capability for storing operational data indicative of corresponding operational conditions and status of the switch. The data stored in registers 14 is periodically transmitted as a block of data over data channels 16 to corresponding data registers 18 in a traffic data management system 20 such as available from AT&T. The operational data received by registers 18 is periodically transmitted on data channels 22 to data storage device 24 which consists of a nonvolatile storage device. The data stored in registers 18 is transferred to data storage 24 on a periodic basis having a frequency sufficient to insure that the registers 18 are clear and ready to accept a new block of data prior to the transmission of the data from registers 14.

A data analysis processor 26 includes input registers 28 which are connected to data channels 22. The input registers 28 receive the blocks of operational data stored in data storage 24. The data analysis processor 26 includes a microprocessor 30 which processes stored program instructions to accomplish the functions as described below. The processor 30 is supported by read-only memory (ROM) 32 which stores operating system and initiation dam, and random access memory (RAM) 34 which is utilized for the storage and retrieval of data utilized in the processes controlled by microprocessor 30. A data storage device 36 such as a hard disk drive is utilized as a nonvolatile storage medium. A keyboard 38 is utilized to provide manual instructions to microprocessor 30. A visual display monitor 40 provides the user, typically a system administrator, with visual feedback of information controlled by microprocessor 30. An input/output interface 42 is coupled to microprocessor 30 and input registers 28. It provides a conventional input/output communication control function which permits the data analysis processor 26 to communicate over data communication channels 44 and 46.

A relational database 48 may consist of a personal computer or work station configured with commercially available software, such as Informix Relational Database Management System. The database is preferably configured to include unprocessed data tables 50 and separate processed (exception) data tables 52. The unprocessed data tables 50 contain the raw or unprocessed operational data originated by usage registers 14 in respective switches. The processed data tables 52 contain exception data conditions as determined by data analysis processor 26 based on the unprocessed data from registers 14. It should be noted that the quantity of data stored in the processed data tables 52 will be substantially smaller than the quantity of unprocessed data stored in data tables 50. Thus, the generation of a report based on exception conditions reflected by records stored in a process data table 52 will require substantially less computational time to be processed by the relational database 48 as compared to identifying the same exception conditions based on corresponding raw data stored in data tables 50.

FIG. 2 illustrates a table 54 of exemplary operational data as collected by usage registers 14 of switches 12 in accord with the prior art. The table provides a visual representation of a block of operational data which is collected for periodic transmission. The table consists of a plurality of records, including records 56, 58, and 60, each containing information relating to an operational characteristic of the switch as determined at a particular time. A plurality of fields associated with each record exists, and in the illustrative example, includes switch identification 62, time-of-measurement 64, equipment identification within the switch 66, and a plurality of parameters, including parameters 68, and 70, representing measured values of characteristics relevant to a particular record. It will be apparent to those skilled in the art that the illustrative table is intended to visually depict that a wide variety of parameters can be measured and utilized.

Records 56, 58, and 60 each represent information concerning switch No. 1 and reflect information as existed at 7:28 a.m. during a given day. In the illustrative example, it is assumed that collective data is maintained on a 24-hour day basis in separate tables so that a date field is not required. The equipment identification field 66 identifies particular equipment, i.e. components of the associated switch. In the example, equipment identifications 15, 16, and 17 associated with switch 1 are correlated to the respective data associated with records 56, 58, and 60, respectively. Measured values of a first and second parameters are associated with each data record as shown in table 54. It will be appreciated that a plurality of additional (not shown) parameters may be collected instead of or in addition to parameters 1 and 2. Preferably, each record contains information in at least one of the parameter fields. The illustrative operational data records are stored in predetermined formats enabling each field within the record to be identified for purposes of data analysis.

FIG. 3 illustrates a table 72 of a visual representation of rules stored in the data analysis processor 26. The rules are utilized to process the data from the usage registers 14 as illustrated in FIG. 2. Each rule is represented by a record 74 which, in the illustrative example, includes a label field 76, a threshold identification 78 and an exception calculation 80. The label field 76 contains a name reflective of the corresponding test to be performed. In the illustrative example, the label "dialdly" in record 76 may represent dial delay test. The threshold field 78 provides a reference or pointer to thresholds stored in table 82 as shown in FIG. 4.

FIG. 4 illustrates a table 82 which in the illustrative embodiment contains a plurality of records each defining upper and lower boundary values or thresholds associated for the test. Records 84, 86, and 88 define boundaries for equipment identifications 15, 16, and 17, respectively, for the "dialdly" test. The threshold field 90 provides a label for each test and equipment combination that identifies corresponding upper and lower threshold boundaries stored in fields 92 and 94. Although each of the tuples 84, 86, and 88 contain the same upper and lower boundaries, different boundary conditions may be utilized for each tuple. The table 82 contains predetermined boundary values for each of the tests which may be performed.

Returning to a consideration of FIG. 3, an exception calculation 80 is performed for each record. In the illustrative example, the calculation consists of multiplying 100 times the value of parameter 1 and dividing the result by the value of parameter 2. This may be best visualized by referring to the first and second parameters referenced in FIG. 2. The exception calculation will yield a numerical test result which is compared with the corresponding upper and lower boundary thresholds for the test as determined by table 82 as shown in FIG. 4. An exception condition is determined to exist if the test result is not within the predetermined boundaries. Considering operational data records 56, 58, and 60 in the illustrative example, only record 56 will be determined to be an exception condition since the exception calculation (100 * $12/870$=1.38) will yield a test result which is not between the boundary of zero and 1.

It will be apparent to those skilled in the art that substantial flexibility exists with regard to the application of the rules and tests. For example, each rule stored in table 72 may be applied to each of the records in table 54 if corresponding parameter values exist. It will also be apparent that alternative ways exist for determining which records in table 54 are to be selected for the application of a given test as represented by a record in table 72. In accordance with the present invention, it is preferable to store table 72 and 82 within the data analysis processor 26 in order to minimize the time required for microprocessor 30 to execute the exception calculations and make the comparisons of the test results with the boundary conditions in order to determine if an exception condition exists.

FIG. 5 illustrates an exception table 100 which comprises one of the processed data tables 52 stored in relational database 48. This table consists of a plurality of records, including record 102, which consists of information associated with an operational data record, such as record 56, determined to be an exception condition by data analysis processor 26. In the illustrative embodiment, a plurality of fields are stored for each record in table 100 including label 104, switch identification 106, equipment identification 108, time-of-measurement 110, test result calculation 112, and upper and lower boundaries 114 and 116. The record 102 illustrates an exception condition determined by comparison of the calculation test result 1.38 with boundaries of 0 and 1, i.e. applying rule 74 to data record 56. It will be understood that the particular fields utilized in table 100 may vary depending upon the particular test utilized and depending upon the quantity of information desired in the exception table. The fore, at(s) of records desired for table 100 is stored in memory of the data analysis processor 26. Upon the data analysis processor 26 determining a test result exceeds the boundary conditions, the components of the corresponding record to be stored in the exception table 100 are transmitted by data channel 46 to relational database 48. In accordance with the present invention, only data which results in an exception condition is stored in the processed data table. Thus, these tables will represent a very small fraction of the total data records contained in tables 50. This enables a traffic engineer to utilize the capabilities of the relational database to analyze the exception table(s) more rapidly and generate reports indicative of problem areas.

However, the traffic engineer may desire to check other characteristics based tests not performed by data analysis processor 26. Preferably, the data records contained in input registers 28 are transmitted via input/output interface 42 and data channel 44 to a table in the unprocessed tables 50 in the relational database 48. Thus, the traffic engineer can quickly generate reports based on the predetermined exception tables 52 or can utilize more computational time and generate reports based on the raw data stored in data tables 50. The storing of both processed and unprocessed data tables gives the administrator flexibility in report generation. It will be apparent that it will be more efficient to utilize the processed data tables 52 whenever possible.

A more specific description of the operation of the data analysis processor 26 and the method in accordance with the present invention is provided in the following Exemplary Steps Table. This table is substantially self-explanatory and is best understood by referring to the figures.

EXEMPLARY STEPS TABLE (A) Operational data collected by a switch is transmitted from a usage register 14 to a corresponding data register 18.

(B) The data register 18 transmits the operational data to data storage 24.

(C) Microprocessor 30 requests the operational data to be transferred from data storage 24 to registers 28. It is then transferred into RAM 34 in preparation for applying the rules which are also stored in RAM 34 to the data. Preferably as a background operation, the microprocessor 30 begins transferring the raw data via interface 42 and channel 44 to a table in the unprocessed data tables 50.

(D) The microprocessor 30 selects the first rule in table 72.

(E) Beginning with the first operational data record as shown in table 54, all operational data records are sequentially searched to locate those to which the first rule is to be applied. In the illustrative example of applying the rule associated with record 74 of table 72, operational data records in table 54 that have values in fields 68 and 70 are selected for the application of the rule.

(F) For each selected operational data record, the rule is applied to yield a test result. In the example, the rule 74 applies the exception calculation of "100* P1/P2" to records 56, 58 and 60 as well as others that have values in the first and second parameter fields 68 and 70.

(G) Each test result is compared against the corresponding upper and lower boundary thresholds defined in table 82.

(H) Test results which exceed the boundary thresholds are determined to be "exceptions".

(I) Microprocessor 30 transmits an exception record to table 100 of database 48 for each exception in accordance with a predetermined format.

(J) The table 100 is completed for the block of operational data received by input registers 28. Similarly, the raw data is transmitted to a table in unprocessed data tables 50 via the background operation of microprocessor 30.

(K) Each periodically generated block of operational data from each switch is handled in a similar manner thereby creating a corresponding set of exception tables which form the processed data tables 52.

The embodiment of the present invention minimizes the computational time required to generate exception reports by preprocessing operational data to generate exception tables which identifies exception conditions. This permits a system administrator to generate reports based on the exception tables more efficiently, since the relational database does not have to process voluminous unprocessed operational data in order to identify exceptions.

In the illustrative embodiment of the present invention, the switches 12 comprise telephone telecommunications equipment. However, any telecommunications nodes used for carrying information which generates operational data will benefit from the present invention. Although a traffic data management system was utilized in the illustrative embodiment to assist in the collection and processing of operational data, it will be apparent to those skilled in the art that the operational data could be communicated to the data analysis processor by other means or directly over an appropriate data network. The illustrative embodiment pictorially represents the data analysis processor as separate from the relational database. However, it will be appreciated by those skilled in the art that the functionality of the data analysis processor and the relational database could be combined provided sufficient computational power was available in a combined physical structure to accomplish the preprocessing in addition to providing traditional relational database capabilities.

Although an embodiment of the present invention has been described and illustrated in the figures, the scope of the invention is defined by the claims which follow.

The invention claimed is:

1. A data analysis apparatus connected between a plurality of telecommunication switches, each collecting data relating to operational conditions of the respective switch, and a database that stores and processes records based on the collected data, the data analysis apparatus comprising:

means for receiving said collected data, said collected data comprising a plurality of unprocessed data records;

memory means for storing rules, each rule defining a test to be applied to said data records;

processing means for applying said rules to said data records to produce corresponding test results for determining if an exception condition exists based on a comparison of each test result and predetermined boundary limits associated with said rules;

means for creating a first table in said database only those data records, for which said processing means determined an exception condition exists;

said processing means and creating means both operating in substantially real time as said collected data is received.

2. The apparatus according to claim 1 wherein said creating means transmits said test results associated with said those data records to the database.

3. The apparatus according to claim 1 wherein said first table is created in the database without requiring processing action by the database.

4. The apparatus according to claim 1 further comprising means for transmitting to the database the collected data received by said receiving means to create another table in the database of the collected data.

5. The apparatus according to claim 4 wherein said collected data is transmitted to the database independent of whether a corresponding exception condition exists.

6. A method for processing data reflecting operational conditions of the switches in a telecommunication system before transferring said data to a database that stores records based on collected data, the method, implemented by a central data analysis processor, comprising the steps of:

receiving said collected data, said collected data comprising a plurality of unprocessed data records;

storing rules where each rule defines a test to be applied to said data records;

applying said rules to said data records to produce corresponding test results;

determining if an exception condition exists based on a comparison of each test result and predetermined boundary limits associated with said rules;

creating to a first table in said database consisting of only those data records for which an exception condition exists;

said applying, determining, and creating steps all being performed in substantially real time as said collected data is received.

7. The method according to claim 6 wherein said creating step transmits said test results associated with said those data records to the database.

8. The method according to claim 6 wherein said first table is created in the database without requiring processing by the database.

* * * * *